Figure 1:
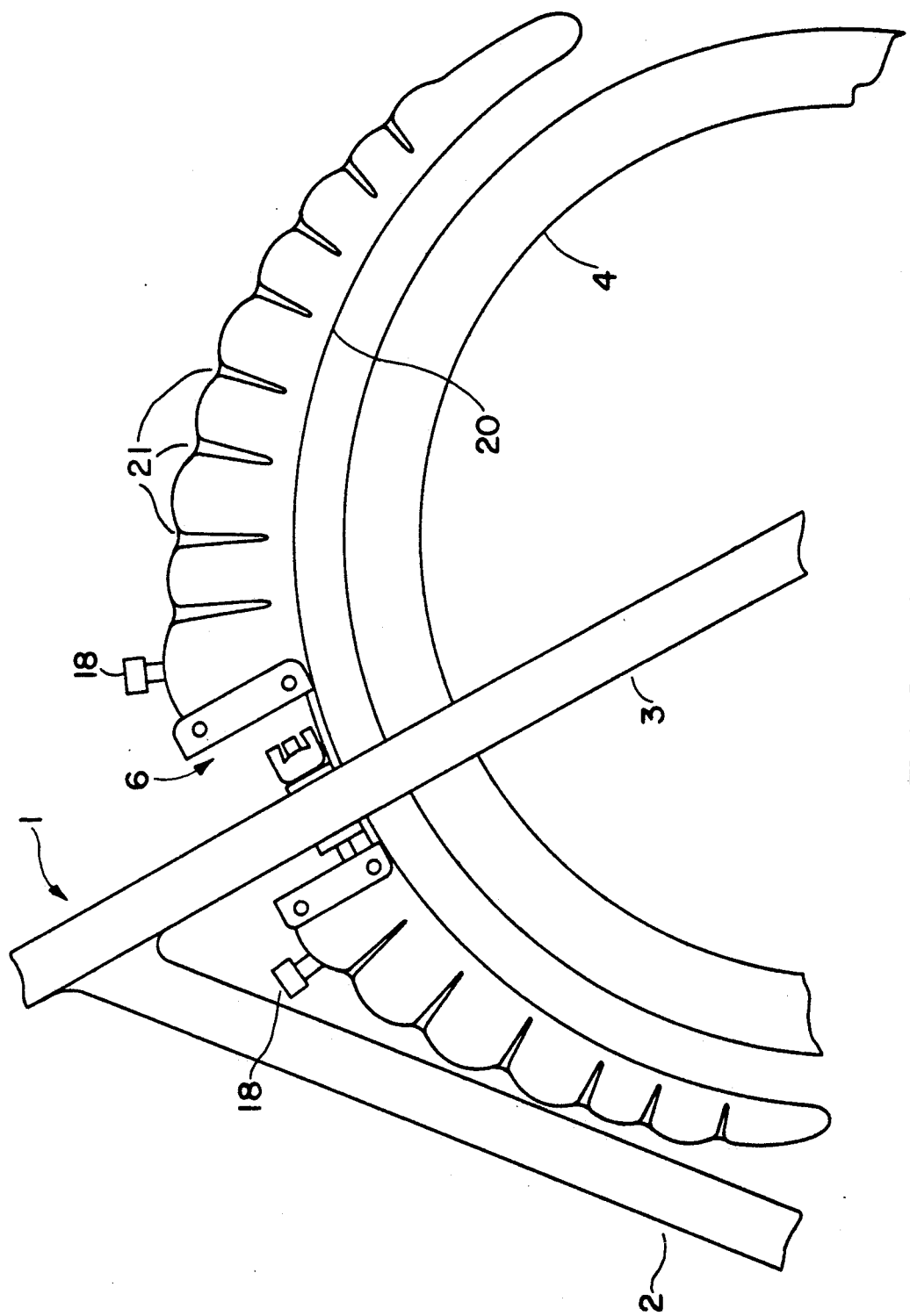

United States Patent [19]

Gasser

[11] Patent Number: 5,275,427
[45] Date of Patent: Jan. 4, 1994

[54] FENDER

[76] Inventor: Karl Gasser, Verdignes Pradello, 50, I-39043, Chiusa, Italy

[21] Appl. No.: 914,264

[22] Filed: Jul. 15, 1992

[30] Foreign Application Priority Data

Jul. 17, 1991 [IT] Italy .............................. BA91A00024

[51] Int. Cl.$^5$ ................................................ B62D 25/16
[52] U.S. Cl. .................................... 280/152.3; 280/852
[58] Field of Search . 280/852X, 152.30, 152.1, 152.2

[56] References Cited

U.S. PATENT DOCUMENTS

| | | | |
|---|---|---|---|
| 4,319,763 | 3/1982 | White | 280/152.3 |
| 5,120,073 | 6/1992 | Sealy, Jr. | 280/152.1 |
| 5,121,935 | 6/1992 | Mathieu et al. | 280/152.3 |

Primary Examiner—Robert R. Song
Attorney, Agent, or Firm—Shlesinger, Fitzsimmons & Shlesinger

[57] ABSTRACT

Fender in particular for bicycles and motorcycles and designed to be fixed to the fork (3,25) and to be curved to surround at a distance the wheel (4) for a certain segment so as to prevent the projection of water and mud caused by rolling of the wheel on the ground from reaching the user of the bicycle or motorcycle.

In accordance with the present invention the fender consists of an air tube (17,29) of inflatable material, a support (6,26) to which is fixed one end of the air tube (17,29), fixing means (13,14) designed to fix the support support (6,26) to the fork (3,25) of the bicycle or motorcycle and suitable means for inflating the air tube (17,29).

8 Claims, 4 Drawing Sheets

FENDER

BACKGROUND OF THE INVENTION

The present invention relates to a fender in particular for bicycles or motorcycles.

The problem for cyclists, who use so-called 'mountain bikes' that are not normally equipped with a fender to reduce to the maximum the weight of the bicycle, is known. Indeed, when cyclists are on muddy terrain they are struck or splashed by water and mud caused by the rolling of the wheels on the ground.

The object of the present invention is to obviate the shortcomings represented by the problem described and to provide a fender designed to be used only in case of need. The object is achieved by the invention as described and claimed hereinafter.

THE DRAWINGS

Figure 2:
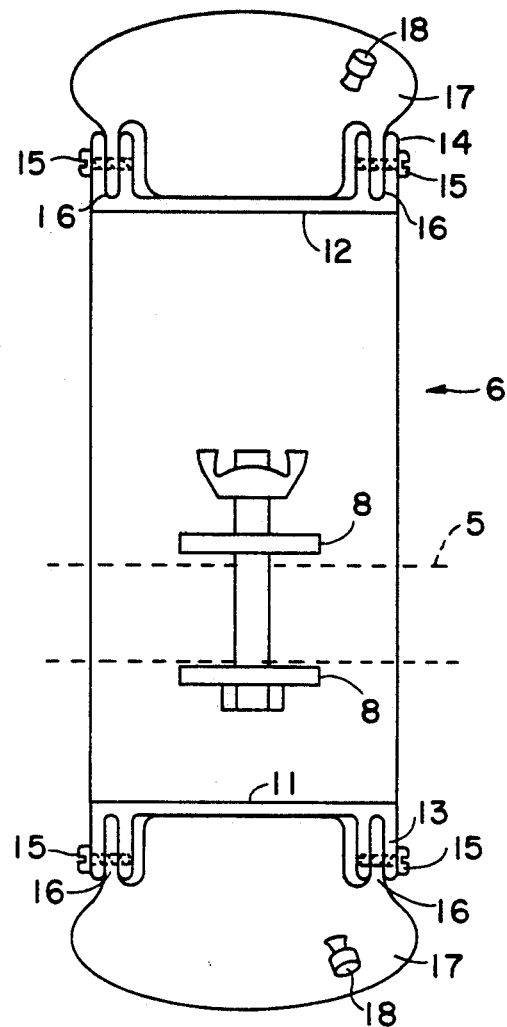
Figure 3:
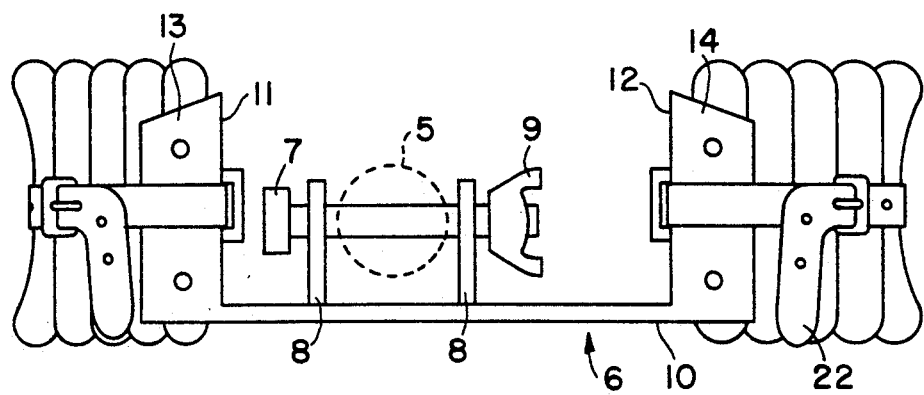
Figure 4:
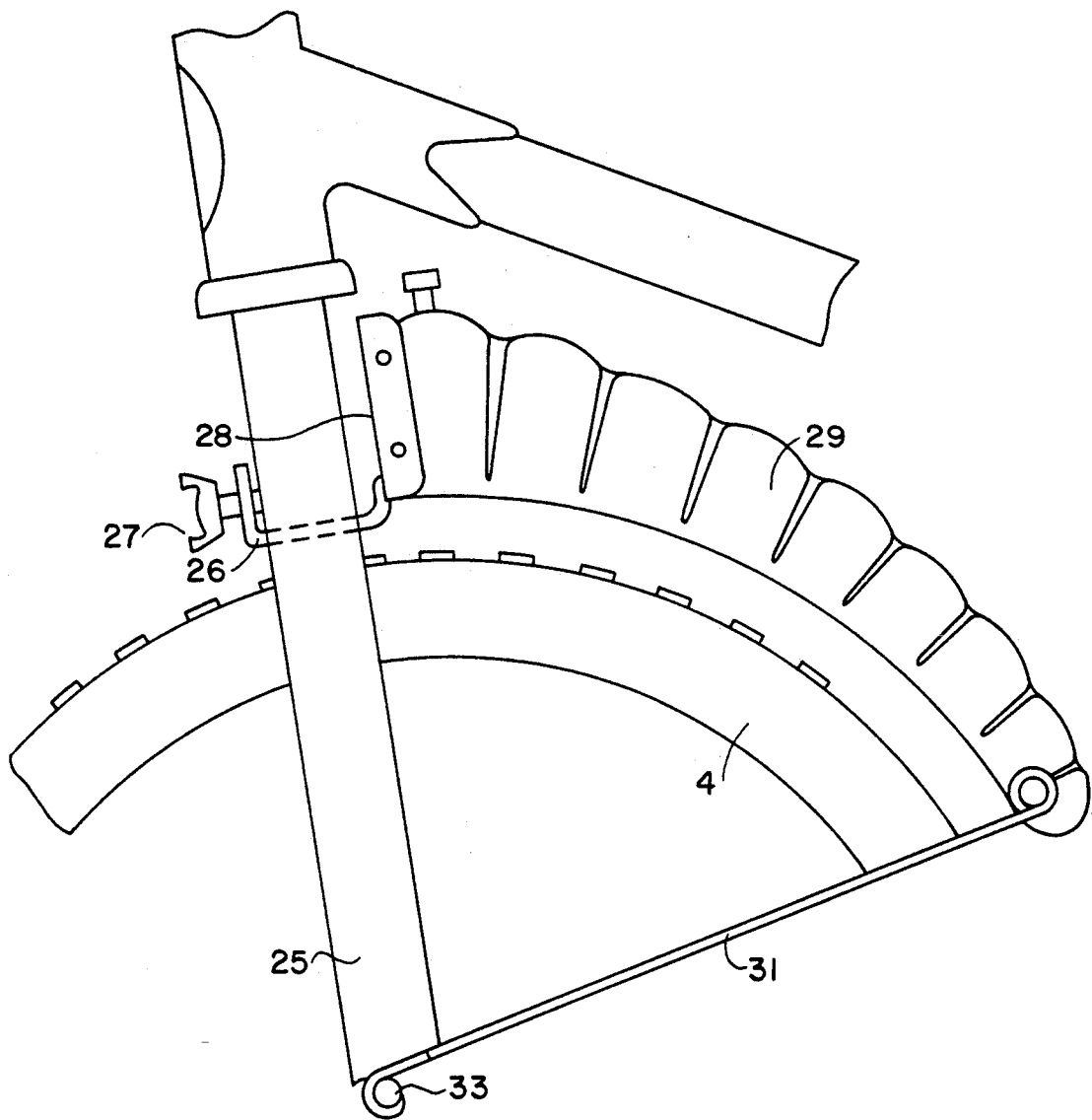
Figure 6:
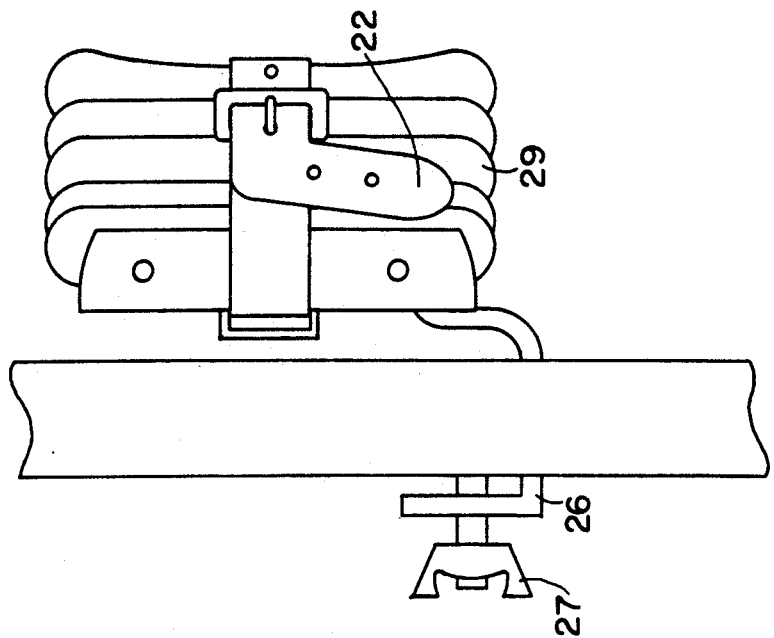
Figure 5:
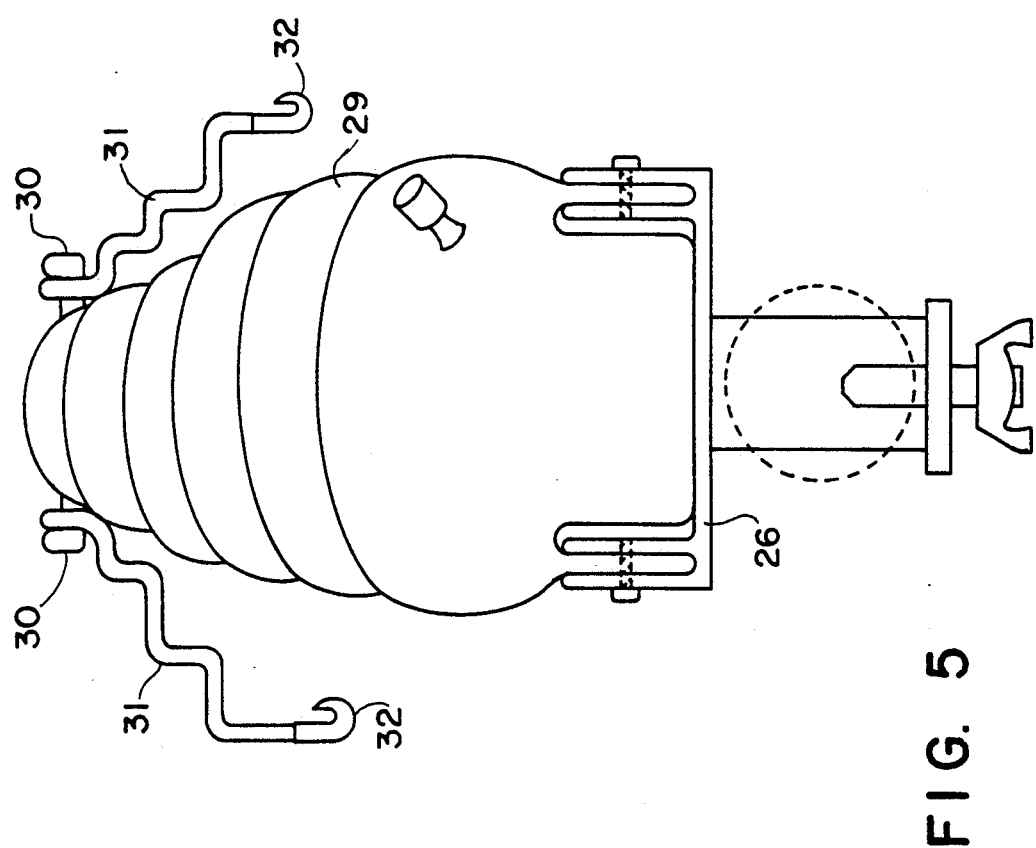

Preferred forms of embodiment are shown in the enclosed drawings wherein:

FIG. 1 shows a fragmentary side elevational view of a first form of embodiment or the fender made in accordance with the present invention, FIG. 2 shows a top plan view of the fender in accordance with FIG. 1, FIG. 3 shows the fender in accordance with FIG. 1 in a side view but in nonoperational position, FIG. 4 shows a second form of embodiment of the fender in accordance with the present invention in a side view, FIG. 5 shows the fender of FIG. 1 in a top view before reaching the operational position, and FIG. 6 shows the fender of FIG. 4 in a side view in a nonoperational position.

PREFERRED EMBODIMENTS OF THE INVENTION

FIG. 1 shows a partial view of the front zone of a bicycle generally indicated by reference number 1 and being of the conventional type. From a frame 2, only partially indicated, extends a fork 3 bearing in a conventional manner between the two tines or legs thereof a rotating wheel 4. In accordance with the present invention the fork 3, in a position spaced from the outer profile of the wheel 4, is fixed e.g. to a transverse tie bolt 5, which extends between the legs of fork 3 as shown schematically in FIG. 3 by broken lines. A bracket 6 is secured to tie-bolt 5 by means of a screw 7 borne by two supports 8 and traversing the tie bolt 5. The screw 7 is secured by a wing nut 9. The bracket 6 has a cross-piece 10 arranged at a distance from the outer profile of the wheel 4 and two end arms 11 and 12 extending outwardly from the cross-piece 10 on the side opposite the wheel 4. From each arm 11, 12 toward the exterior of the bracket 6 extend two sets of flanges 13 and 14 respectively. As may be seen in FIG. 2, secured to the flange sets 13 and 14 by means of screws 15 are tabs 16 projecting from one end each of a pair of air tubes 17. Preferably on the side opposite that near the wheel 4, each air tube is provided with a valve 18 for inflation of the air tube 17 with air under pressure. Preferably the valves 18 are identical to those of the wheel 4 so that both the air tube 17 and the wheel 4 can be inflated by using the same pump connection (not shown). Each air tube 17 is formed from a closed tube having a bottom 20 of a structure designed so as to arrange itself in an arcuate path substantially at an uniform distance along a segment above the upper profile of an wheel 4 when the air tube 17 is inflated. The structure could be for example provided with a plurality of reinforcements not shown for the bottom and designed to stabilize an air tube 17 perpendicularly to the plane formed by the wheel 4. Each air tube 17 has in addition at the top a plurality of indentations 21 so as to allow arrangement like a bellows of the deflated air tube to enable the deflated air tube 17 to be gathered into a retracted position on the arm 12 by a strap 22.

FIGS. 4 to 6 show a wheel 4 borne by a fork 25 to which a half-bracket 26 is fixed by a wing screw 27. The arm 28 of the half-bracket 26 is also turned away from the wheel 4 and bears in the manner described above the end of an air tube 29. The free end of the air tube 29 is provided with two mutually opposing buttons 30 at the same level for fixing each button 30 to one of the ends of each of a pair of cords 31, the free end of which are formed like a hook 32 designed to be hooked to opposite ends of the hub 33 of the wheel 4 so as to hold the air tube 24 firmly in position.

Many variants of the fender in accordance with the present invention are possible without leaving the scope of protection of the present invention. Some of these variants could be the following.

1. The air tube could be divided internally by partitions forming several chambers for example communicating together or, if not communicating, the chamber being equipped with a valve for inflation thereof.

2. The cross section profile of the air tube will normally be symmetrical to a plane in which lies the bicycle wheel. It could however have any suitable form, e.g. with lateral projections arranged like a roof above the top profile of the wheel.

3. Instead of providing a bracket with one or two arms and a fastening strap, there could be provided also a suitable box or cylinder in which to insert the deflated air tube gathered with the option of closing the box with a cover for preservation of the air tube when it is not required.

I claim:

1. A fender for vehicles such as bicycles and motorcycles, and designed to be fixed to the fork (3, 25) of the frame of such a vehicle and to be curved to surround at a distance a portion of a wheel (4) mounted on said frame so as to prevent water and mud discharged by the rolling of said wheel of the vehicle on the ground from reaching the user of the bicycle or motorcycle, characterized in that said fender comprises an air tube (17, 19) of inflatable material, a support (6, 26) to which is fixed one end of said air tube (17, 29), means (13, 14) fixing said support (6, 26) to the fork (3, 25) of said vehicle, and suitable means for inflating said air tube (17, 29) to cause the opposite end thereof to advance in an arcuate path from a retracted position adjacent said support to an advanced position in which said tube is curved to overlie said portion of said wheel.

2. Fender in accordance with claim 1 characterized in that the support comprises a bracket (6, 26) having at least one arm (11, 12, 28) turned away from the wheel (4) and to said arm 11, 12, 28) being fixed said one end of said air tube (17, 29).

3. Fender in accordance with claim 2 characterized in that said opposite end of said tube, when the tube (17, 29) is deflated, is releasably secured to the arm (11, 12, 28) by a strap (22).

4. Fender in accordance with claim 2 characterized in that said opposite end of the air tube (17, 29) is connected by at least one cord (31) to said fork (3, 25) so as to hold said opposite end the air tube (17, 29) firmly in said advanced positioned thereof.

5. Fender in accordance with claim 1 characterized in that the air tube is provided with a valve (18) for filling the tube with air.

6. Fender in accordance with claim 5 characterized in that the valve (18) is identical to those of the wheels (4) so as to enable use of the same pump.

7. Fender in accordance with claim 1 characterized in that the support is formed by a container designed to receive a deflated and gathered air tube 17,29 and to be closed by a cover.

8. Fender in accordance with claim 1 characterized in that the air tube has lateral projections arranged like a roof beside the top profile of the wheel.

* * * * *